(12) United States Patent
Spindler et al.

(10) Patent No.: US 10,208,231 B2
(45) Date of Patent: Feb. 19, 2019

(54) HIGH PERFORMANCE SEALANT COMPOSITION FOR TIRE REPAIR

(71) Applicant: Illinois Tool Works Inc., Glenview, IL (US)

(72) Inventors: Martin Patrick Spindler, Herdwangen-Schönach (DE); Shees N. Sulemanji, Grover Beach, CA (US); Henry Friedrich Ferdinand Klemm, Ueberlingen (DE); Brandt A. Haener, Los Osos, CA (US); Bryan Douglas Smith, Arroyo Grande, CA (US); Gordon Chetosky, Hinsdale, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 11 days.

(21) Appl. No.: 14/942,868

(22) Filed: Nov. 16, 2015

(65) Prior Publication Data

US 2016/0168431 A1  Jun. 16, 2016

Related U.S. Application Data

(60) Provisional application No. 62/104,267, filed on Jan. 16, 2015, provisional application No. 62/091,294, filed on Dec. 12, 2014.

(51) Int. Cl.
| | | |
|---|---|---|
| *C09J 107/02* | (2006.01) | |
| *B29C 73/16* | (2006.01) | |
| *C08K 5/053* | (2006.01) | |
| *C08K 3/26* | (2006.01) | |
| *C08K 5/00* | (2006.01) | |
| *C08K 3/01* | (2018.01) | |

(52) U.S. Cl.
CPC ........... *C09J 107/02* (2013.01); *B29C 73/163* (2013.01); *C08K 3/01* (2018.01); *C08K 3/26* (2013.01); *C08K 5/0008* (2013.01); *C08K 5/053* (2013.01); *C08K 2003/265* (2013.01)

(58) Field of Classification Search
CPC .......... C09J 107/02; C08K 5/053; C08K 3/26; C08K 5/0008; C08K 3/0008; C08K 2003/265; C08K 3/01; B29C 73/163; B29C 73/16
USPC .................................. 524/388, 386
See application file for complete search history.

(56) References Cited

U.S. PATENT DOCUMENTS

| | | |
|---|---|---|
| 2,357,650 A | 9/1944 | Hall |
| 3,352,696 A | 11/1967 | Wallace |
| 3,739,829 A | 6/1973 | Powell et al. |
| 4,337,322 A | 6/1982 | Jaspon |
| 4,501,825 A | 2/1985 | Magyar et al. |
| 5,371,136 A | 12/1994 | Brooks et al. |
| 5,466,518 A | 11/1995 | Isaac et al. |
| 5,856,376 A | 1/1999 | Wong |
| 6,063,837 A | 5/2000 | Kawamura et al. |
| 6,454,892 B1 | 9/2002 | Gerresheim et al. |
| 6,818,596 B1 | 11/2004 | Hayes |
| 6,840,990 B2 | 1/2005 | Gallagher et al. |
| 6,864,305 B2 | 3/2005 | Kishida et al. |
| 7,388,041 B2 | 6/2008 | Cegelski et al. |
| 7,868,061 B2 | 1/2011 | Cegelski et al. |
| 7,960,448 B2 * | 6/2011 | Hirata ............... B29C 73/163 523/166 |
| 8,772,370 B1 | 7/2014 | Sulemanji |
| 9,085,668 B2 * | 7/2015 | Sakai .................. C08K 9/04 |
| 2004/0010059 A1 | 1/2004 | Kojima et al. |
| 2004/0048962 A1 | 3/2004 | Kojima et al. |
| 2011/0201722 A1 * | 8/2011 | Takahara ............. B29C 73/163 523/166 |
| 2012/0125235 A1 | 5/2012 | Azeyanagi et al. |

FOREIGN PATENT DOCUMENTS

| | | |
|---|---|---|
| CS | 242810 B1 * | 5/1986 |
| DE | 198 44 177 B4 | 4/2000 |
| EP | 0 200 382 A2 | 12/1986 |
| EP | 0 753 420 B1 | 1/1997 |
| EP | 0 846 552 A2 | 6/1998 |
| EP | 0 846 552 B1 | 6/1998 |
| EP | 0 200 382 B1 | 12/1998 |
| EP | 0 972 616 B1 | 1/2000 |
| EP | 0 988 960 A2 | 3/2000 |
| EP | 1 372 941 B1 | 1/2004 |
| EP | 2719665 A1 | 4/2014 |
| FR | 1.016.016 | 10/1952 |
| JP | 2003-82327 | 3/2003 |
| JP | 2003-193029 | 7/2003 |
| JP | 2005120273 A * | 5/2005 |

(Continued)

OTHER PUBLICATIONS

JP 2005-120273 (2005), mahcine translation, JPO Japan Platform for Patent Information (J-PlatPat).*

(Continued)

*Primary Examiner* — Josephine L Chang

(74) *Attorney, Agent, or Firm* — Maxwell J. Petersen; Lewis Brisbois Bisgaard & Smith LLP

(57) ABSTRACT

A high performance sealant for repairing punctures in tires includes a highly filtered natural rubber latex, an ultra-fine inorganic powder, a polyamide suspension, and an antifreeze agent that includes water and at least one of ethylene glycol and propylene glycol. The high performance sealant can readily pass through a valve stem of a tire without removing the core and seal, and provides a strong and durable sealing of the puncture.

15 Claims, No Drawings

(56) References Cited

FOREIGN PATENT DOCUMENTS

| JP | WO 2012173114 A1 | * | 12/2012 | ............... C08K 9/04 |
|----|------------------|---|---------|---------------------------|
| KR | 2010041368 A | * | 4/2010 | |
| WO | WO 2006/058104 A2 | | 6/2006 | |
| WO | WO 2007/112010 | | 10/2007 | |
| WO | WO 2012085869 A1 | * | 6/2012 | ........... B29C 73/163 |

OTHER PUBLICATIONS

CS 242810 B1 (1986), SciFinder abstract.*
Disparlon® AQH-800, datasheet, Kusumoto Chemicals, Ltd. (Jun. 2011).*
KR 2010-041368 A, machine translation, KIPO Korean Intellectual Property Rights Information Service (KIPRIS). (Year: 2010).*
International Preliminary Report on Patentability, dated Jul. 18, 2017 in International Application PCT/2016/013809.

* cited by examiner

HIGH PERFORMANCE SEALANT COMPOSITION FOR TIRE REPAIR

RELATED APPLICATIONS

The patent application claims priority to U.S. Provisional Patent Application 62/104,267, filed on Jan. 16, 2015 and U.S. Provisional Application No. 62/091,294, filed on Dec. 12, 2014.

FIELD OF THE INVENTION

This invention is directed to a high performance sealant for repairing leaks in tires, and a method for making the high performance sealant.

BACKGROUND OF THE INVENTION

Various puncture sealing agents have been used for repairing leaks in tires. U.S. Pat. Nos. 7,388,041 and 7,868,061, both to Cegelski et al., disclose a puncture sealing agent that includes a rubber latex, an adhesive agent and an antifreeze agent. The antifreeze agent can be glycerin, potassium acetate, or a solution of glycerin and potassium acetate. U.S. Pat. No. 8,772,370, issued to Sulemanji, discloses an environmentally safe, biodegradable aqueous antifreeze solution and a puncture sealing composition containing it. The antifreeze solution includes an antifreeze agent selected from trimethyl glycine, dimethyl sulfoxide, and derivatives and combinations thereof.

Other conventional water-based antifreeze agents include aqueous mixtures of ethylene glycol and/or propylene glycol. Conventional puncture sealing agents are relatively viscous and cannot be injected through the valve stem of a tire without removing the core and seal. Conventionally, the higher viscosity has been needed in order for the puncture sealing agent to effectively seal the tires.

There is a need or desire for a higher performance puncture sealing agent that can be injected through the valve stem without removing the core and seal, which provides a high performance sealing of the punctures in the tires.

SUMMARY OF THE INVENTION

The present invention is directed to a high performance sealant for repairing leaks in tires and a method for making the high performance sealant. The sealant includes a highly filtered natural rubber latex substantially free of coagulants, achieved by filtering the natural rubber latex. The sealant also includes an ultra-fine inorganic powder to enhance puncture sealing capability, an anti-settling agent to keep the ultra-fine inorganic powder in suspension, and an aqueous anti-freeze agent.

The combination of natural rubber latex substantially free of coagulating agent, ultra-fine inorganic powder and anti-settling agent provide the high performance sealant with the small particle size and limited viscosity needed to enable injection of the sealant through the valve stem of a tire without removing the core and seal. The combination of ingredients also provides a highly effective sealing of tire punctures notwithstanding the relatively low viscosity of the sealant.

With the foregoing in mind, it is a feature and advantage of the invention to provide a high performance sealant for tire repair that is relatively easy to inject without compromising the integrity of the repair. The foregoing and other features and advantages of the invention will become further apparent from the following Detailed Description of the Invention.

DETAILED DESCRIPTION OF THE INVENTION

The high performance sealant of the invention includes a natural rubber latex substantially free of coagulants, an ultra-fine inorganic powder, an anti-settling agent, and an aqueous antifreeze agent. The natural rubber latex is suitably filtered through a mesh screen, for example a 300-500-mesh screen, suitably a 400-mesh screen, to remove coagulants and control the particle size of the natural rubber latex. By pumping natural rubber latex through a mesh screen, the average particle size of the natural rubber latex that pushes through the screen can be controlled to about 400 microns or less and be substantially free of coagulants. This places the natural rubber latex in a fine, flowing state that enables passage through the valve stem of a tire without removing the core and seal.

Suitable filtered natural rubber latexes include without limitation high ammonia natural rubber latexes sold by Centrotrade Rubber, Inc. under the name CENTEX HF. CENTEX HF has a total solid content of about 61-63% by weight, a dry rubber content of about 59-61% by weight, an ammonia content of 0.06-0.08 by weight, with a balance substantially of water. The natural rubber latex can be present in the high performance sealant in an amount of about 20-50% by weight, suitably about 30-40% by weight.

The inorganic powder should also have an ultra-fine particle size in order to facilitate passage of the high performance sealant through the valve stem of a tire, without removing the core and seal. The inorganic powder may suitably have an average particle diameter of about 150 nanometers or less, suitably about 100 nanometers or less, or about 50-80 nanometers. Suitable inorganic powders include without limitation calcium carbonate, barium carbonate, silicon dioxide, titanium dioxide, calcium sulfate, barium sulfate, aluminum oxide, and the like. The ultra-fine inorganic powder can be present in the high performance sealant at about 0.25-10.0% by weight, suitably about 0.5-2.5% by weight. The ultra-fine inorganic powder, combined with the filtered natural rubber latex that is substantially free of coagulants, together facilitate the formation of a strong and long-lasting sealing and repair of the punctured tire.

The polyamide suspension operates as an anti-settling agent to keep the ultra-fine inorganic powder in suspension during storage and use of the high performance sealant. One suitable polyamide suspension is DISPARLON® AQH-800, available from King Industries, Ltd. DISPARLON® AQH-800 is a paste-like suspension of a proprietary polyamide in a solvent that includes water and propylene glycol monomethyl ether. The polyamide suspension can be present in the high performance sealant at about 0.10-5.0% by weight, suitably about 0.20-1.2% by weight. The polyamide suspension can also be combined with similar amounts of a silica suspension for improved anti-settling properties.

The aqueous antifreeze agent can include water and at least one of ethylene glycol and propylene glycol. The aqueous antifreeze agent can be present in the high performance sealant at about 30-70% by weight, suitably about 40-60% by weight. The water can constitute about 10-30% by weight of the antifreeze agent, suitably about 15-25% by weight, and can constitute about 5-15% by weight of the high performance sealant, suitably about 8-12% by weight. The ethylene glycol and/or propylene glycol can constitute the balance of the antifreeze agent and can constitute about 20-60% by weight of the high performance sealant, suitably about 30-50% by weight. When ethylene glycol and propylene glycol are both present, the ethylene glycol can constitute about 30-70% by weight, suitably about 40-60% by weight of the antifreeze agent and can constitute about 15-35% by weight, suitably about 20-30% by weight of the high performance sealant. The propylene glycol can then constitute about 10-50% by weight, suitably about 20-40% by weight of the antifreeze agent, and can constitute about 8-25% by weight, suitably about 12-20% by weight of the high performance sealant composition.

The high performance sealant can also include synthetic rubber latex in an amount of about 2-10% by weight, suitably about 3-8% by weight. Suitable synthetic rubber latexes include without limitation styrene-butadiene rubber, acrylonitrile butadiene rubber, ethylene vinyl acetate rubber, chloroprene rubber, vinyl pyridine rubber, and butyl rubber. The synthetic rubber latex aids in reinforcing the seal, but should be present in a small enough quantity and small enough particle size so as not to hinder passage of the high performance sealant through the valve stem of a tire.

The high performance sealant can also include a tackifier in an amount of about 3-15% by weight, suitably about 5-10% by weight. The tackifier serves as an adhesive agent for the high performance sealing composition, and should be selected from compounds that do not cause aggregation of the natural rubber latex or the synthetic rubber latex. Suitable tackifiers include without limitation terpene resins, phenolic resins, polyvinyl esters, polyvinyl alcohol, polyvinyl pyrrolidone, and the like.

By selecting the proper combination of ingredients and particle sizes, a high performance sealant can be provided that flows easily, does not aggregate prior to use, passes through valve stems without removing the core and seal, and then forms a strong and durable seal to repair the puncture.

EXAMPLE

A high performance sealant was prepared having the following composition.

| Ingredient | Product Name | Supplier | Percent by Weight |
| --- | --- | --- | --- |
| Ethylene Glycol | | | 24.90 |
| Propylene Glycol | | | 15.68 |
| Deionized Water | | | 10.41 |
| Resin/Tackifier | | | 7.07 |
| Synthetic Latex | | | 4.63 |
| Natural Latex (High Ammonia) | CENTEX HF (filtered) | Centrotrade Rubber, Inc. | 34.73 |
| Ultra-fine Calcium Carbonate (50-80 nm) | | | 1.00 |
| Polyamide Suspension | DISPARLON ® AQH-800 | King Industries, Ltd. | 0.50 |

The foregoing high performance sealant was passed through a valve stem of a tire without removing the stem and core, and formed a strong and durable seal in the punctured area.

The embodiments of the invention described herein are presently preferred. Various modifications and improvement can be made without departing from the spirit and scope of the invention. The scope of the invention is defined by the appended claims, and all changes that fall within the meaning and range of equivalents are intended to be embraced therein.

We claim:

1. A high performance sealant, comprising:
    about 20% to about 50% by weight of a natural rubber latex;
    about 0.25% to about 10% by weight of an inorganic powder;
    about 0.10% to about 5% by weight of a polyamide suspension;
    about 30% to about 70% by weight of an antifreeze agent including, by weight of the antifreeze agent, 10% to 30% water and a balance of at least one of ethylene glycol and propylene glycol; and
    2% to 8% by weight of a synthetic rubber latex;
    wherein the inorganic powder is selected from the group consisting of calcium carbonate, barium carbonate, titanium dioxide, calcium sulfate, barium sulfate, and aluminum oxide.

2. The high performance sealant of claim 1, wherein the natural rubber latex is filtered to remove coagulants.

3. The high performance sealant of claim 1, wherein the natural rubber latex comprises natural rubber and ammonia.

4. The high performance sealant of claim 1, wherein the natural rubber latex has an average particle size of about 400 microns or less.

5. The high performance sealant of claim 1, wherein the inorganic powder has an average particle size of about 150 nanometers or less.

6. The high performance sealant of claim 5, wherein the inorganic powder comprises calcium carbonate having an average particle size of about 100 nanometers or less.

7. The high performance sealant of claim 1, wherein the antifreeze agent comprises about 30-70% by weight ethylene glycol, about 10-50% by weight propylene glycol, and 10-30% by weight water.

8. The high performance sealant of claim 1, further comprising a tackifier.

9. The high performance sealant of claim 8, comprising about 3-15% by weight of the tackifier.

10. A high performance sealant, comprising:
    about 20-50% by weight of a natural rubber latex having an average particle size of about 400 microns or less;
    about 0.25-10% by weight of an inorganic powder having an average particle size of about 150 nanometers or less;
    about 0.10-5.0% by weight of a polyamide suspension;
    about 30-70% by weight of an antifreeze agent including, by weight of the antifreeze agent, 10% to 30% water and a balance of at least one of ethylene glycol and propylene glycol; and
    2% to 8% by weight of a synthetic rubber latex;
    wherein the inorganic powder is selected from the group consisting of calcium carbonate, barium carbonate, titanium dioxide, calcium sulfate, barium sulfate, and aluminum oxide.

11. The high performance sealant of claim 10, wherein the polyamide suspension comprises polyamide suspended in water.

12. The high performance sealant of claim 10, wherein the antifreeze agent comprises about 40-60% by weight ethylene glycol, about 20-40% propylene glycol, and 10-30% by weight water.

13. The high performance sealant of claim 10, comprising:
    about 30-40% by weight of the natural rubber latex;
    about 0.5-2.5% by weight of the inorganic powder;

about 0.2-1.2% by weight of the polyamide suspension; and about 40-60% by weight of the antifreeze agent.

14. The high performance sealant of claim 13, further comprising about 5-10% by weight of a tackifier.

15. A high performance sealant, comprising:

about 20-50% by weight of a filtered natural rubber latex having an average particle size of about 400 microns or less;

2% to 8% by weight of a synthetic latex;

about 0.25-10% by weight of an inorganic powder having an average particle size of about 100 nanometers or less;

about 0.10-0.50% by weight of an aqueous polyamide suspension;

about 3-15% by weight of a tackifier; and about 30-70% by weight of an antifreeze agent including ethylene glycol, propylene glycol and, by weight of the antifreeze agent, 10% to 30% water;

wherein the inorganic powder is selected from the group consisting of calcium carbonate, barium carbonate, titanium dioxide, calcium sulfate, barium sulfate, and aluminum oxide.

\* \* \* \* \*